Jan. 7, 1964     P. W. RAMSEY     3,117,215
ALTERNATING CURRENT CONSTANT POTENTIAL WELDING APPARATUS
Filed Dec. 18, 1961
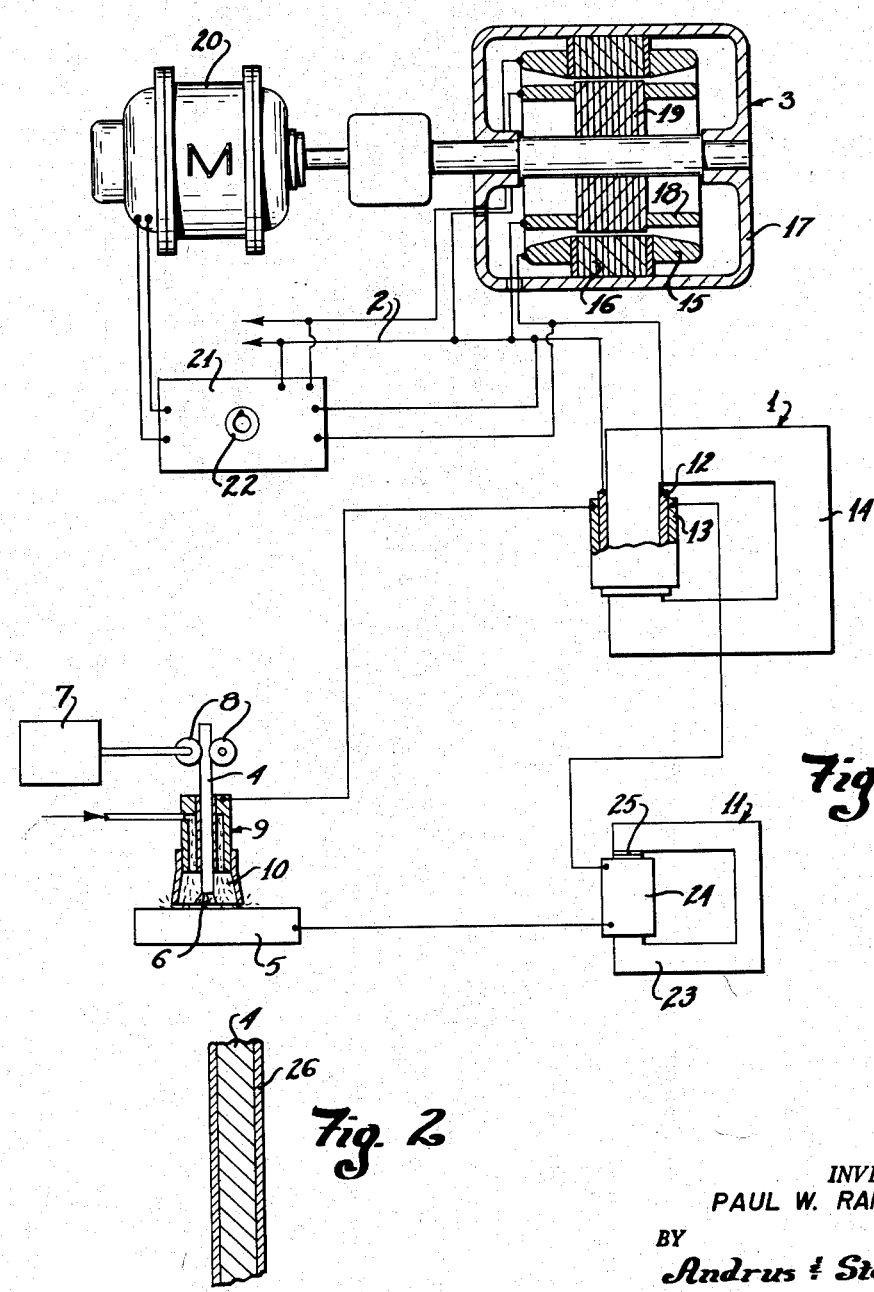
INVENTOR.
PAUL W. RAMSEY
BY
*Andrus & Starke*
Attorneys United States Patent Office 3,117,215
Patented Jan. 7, 1964

3,117,215
ALTERNATING CURRENT CONSTANT POTENTIAL WELDING APPARATUS
Paul W. Ramsey, Wauwatosa, Wis., assignor to A. O. Smith Corporation, Milwaukee, Wis., a corporation of New York
Filed Dec. 18, 1961, Ser. No. 160,224
11 Claims. (Cl. 219—74)

This invention relates to an alternating current constant potential welding apparatus for establishing and maintaining an alternating current welding arc.

Arc welding power sources are classified generally as alternating current or direct current power sources (hereinafter referred to respectively as A.C. or D.C. sources).

Generally, D.C. power sources are either of a constant potential variety having a substantially constant voltage characteristic or a constant current variety having a drooping voltage characteristic. In a constant potential power source, the voltage output of the power source is maintained essentially constant for all welding currents. In a constant current power source, the output voltage of the power source drops as the welding current increases.

Alternating current power sources have uniformly been of the drooping voltage or constant current characteristics in order to provide a stable welding arc. Although constant potential alternating current power sources have been suggested, they have not been commercially employed. For example, Patents 2,532,410 and 2,532,411 both disclose constant potential welding power sources for arc welding. Although they suggest that either A.C. or D.C. current can be employed, they clearly state that the D.C. is considered more desirable.

Alternating current constant potential welding sources have many advantages from the standpoint of initial cost, operating costs and characteristics and simplicity of control. For example, the arc blow problem occasionally encountered in welding with gas shielding and D.C. constant potential power sources would be essentially eliminated. However, the instability of the arc of a constant potential alternating current power source has been such that proper and adequate welds have not been obtainable.

In alternating current arc welding, the arc current reverses its direction of flow many times each second. Commercial alternating current supplied by the power companies has a frequency of 60 cycles per second, which means that its direction of flow is reversed 120 times each second. In undergoing a reversal of direction, the current passes momentarily through a zero value and the electric arc is momentarily extinguished. The supply voltage must then be sufficient to re-establish the arc. In A.C. constant current power supply, the voltage increases momentarily to restrike the arc. However, such systems require special arc responsive electrode feeds and the like. A.C. constant potential supplies having a sufficient restriking arc voltage introduce severe hazards to personnel because of the high open circuit voltages required.

The present invention is directed to an A.C. constant potential welding system for consumable electrode arc welding and creates a stable alternating current welding arc with a constant potential power input of the usual low open circuit voltages. The A.C. power source of the present invention can directly replace the present D.C. power sources and employ the same wire feeding mechanism and the like.

In accordance with the present invention, a constant potential alternating current power supply is connected in a welding circuit including means for supplying a highly emissive material to the arc and a proper inductance in the output circuit. The emissive material is preferably supplied as an integral part of a consumable electrode. It has been found that by employing a properly selected inductance and emissive material, the arc current and supply voltage of the constant potential source shift in phase sufficiently to readily reignite the arc and maintain a stable alternating current arc.

The drawing furnished herewith illustrates the best mode presently contemplated for carrying out the invention.

In the drawing:
FIG. 1 is a diagrammatic illustration of an A.C. constant potential welding system constructed in accordance with the present invention; and
FIG. 2 is an enlarged fragmentary view of an electrode shown in FIG. 1.

Referring to the drawing, an A.C. constant potential arc welding system is illustrated including a transformer 1 having an input connected to incoming alternating current power lines 2 which may be a part of the conventional power distribution system that supplies 60 cycle alternating current. A voltage regulator 3 is interposed between the transformer 1 and lines 2 for adjusting or presetting the output voltage of the transformer 1 and to provide automatic line voltage compensation, as more fully described hereinafter.

The voltage regulator 3 is shown for purposes of illustration and may be replaced with a magnetic amplifier or any other similar voltage control as desired.

A consumable electrode 4 and a work member 5 are connected to opposite sides of the output of transformer 1 which is adapted to establish and maintain an arc 6 therebetween. A constant speed motor 7 is coupled to drive suitable feed rolls 8 which frictionally grip the electrode and feed it through a welding nozzle 9 to the work member 5 at a constant feed rate. The nozzle 9 includes means, not shown, for connecting the power supply to the electrode 4 and is mounted to properly locate the tip of electrode 4. A shielding gas 10 is fed through the welding nozzle 9 to envelope arc 6. A stabilizing reactor 11 is serially connected in the output circuit between transformer 1 and the electrode 4. The reactance of reactor 11 is designed to establish and maintain a stable alternating current constant potential welding arc, as hereinafter described.

The illustrated transformer 1 is of any suitable constant potential construction and is diagrammatically shown including a primary winding 12 and a secondary winding 13 concentrically wound upon a core 14. The windings 12 and 13 are closely superimposed on the core 14 to provide a close coupled step-down transformer 1 having excellent voltage output regulation. The output voltage therefore follows the input voltage proportionally in accordance with the turns in the primary winding 12 and the secondary winding 13. The output of the transformer 1 is essentially constant at the preset potential for all output currents drawn from the secondary winding 13 and may be maintained at 55 volts on open circuit for maximum safety.

The voltage regulator 3 is of any suitable construction for controlling the voltage applied from the incoming power lines 2 to the primary winding 12 of transformer 1. The illustrated regulator 3 is diagrammatically shown as including a fixed primary winding 15 connected across the incoming A.C. power lines 2 in parallel with the primary winding 12 of the transformer 1. Primary winding 15 is wound on an annular core 16 and secured within a suitable housing 17. A secondary winding 18 is wound on cylindrical rotor core 19 which is rotatably mounted within core 16 for selective angular positioning of winding 18 with respect to winding 15. The winding 18 is connected in series between the fixed primary winding 15 of the regulator 3 and the primary 12 of the transformer 1.

Primary winding 15 of regulator 3 is excited from the

A.C. power lines 2 and induces an electromotive force or voltage in the secondary winding 18. The induced voltage in winding 18 is dependent upon the relative positioning of the winding 18 with respect to the winding 15.

A control motor 20 is connected to control the positioning of the secondary winding 18 with respect to the winding 15. An input and feedback control or other similar control unit 21 is connected to control the operation of the control motor 20 for proper positioning of the secondary winding 18. Unit 21 may be of any well known construction and is briefly described as follows.

The input and feedback control unit 21 is connected to the incoming power lines 2 for primary excitation and to the output of the regulator 3. A reference voltage derived from the power lines 2 is compared with a feedback voltage from the output side of the regulator 3 within the feedback unit 21. Control motor 20 is energized in accordance with the comparison of the voltages fed to unit 21 and positions the secondary winding 18 until a selected voltage balance is established. A control knob 22 is provided for manually setting the reference voltage derived from the power lines 2 and thereby controls the positioning of secondary winding 18 and the output of regulator 3. Although a change in the incoming line voltage from power lines 2 is reflected in both the regulator 3 and the control unit 21, the proportional change is much greater in the regulator 3 and consequently automatic line voltage compensation is substantially established.

The illustrated reactor 11 includes an iron core 23 on which a reactance winding 24 is wound. The winding 24 is connected in series between the secondary winding 13 of transformer 1 and the electrode 4 and inserts a reactance, or reactive voltage, in series with the arc 6. The reactance in the circuit creates a slight phase shift between the supply voltage and the current through arc 6. When the arc current is passing through zero, the supply voltage is removed from the zero voltage position in the cycle and is at a value sufficient to reignite and establish arc 6.

The iron core 23 of reactor 11 includes a small air gap 25 which maintains the flux density in the core below saturation with maximum welding current.

Electrode 4 is a suitable mild steel or the like. An additive of a highly emissive substance such as cesium or rubidium is added either directly within the body of the electrode or as an outer coating. The electrode 4 may be formed by extrusion dipping, spraying or any other suitable means wherein the additive can be initimately and automatically supplied to the arc 6 by the feeding of the electrode 4 to arc 6. Applicant has found that rubidium which can be added to form a composite bare wire electrode provides a stable arc; for example, as shown and more fully described in the copending application of Paul W. Ramsey and Michael W. Zimmermann, entitled Composite Consumable Electrode Containing Emissive Compounds and Method of Manufacture, which was filed August 1, 1960 with Serial No. 46,950 and which is assigned to a common assignee of the present application. For purposes of simplicity of illustration of the invention, a very thin film or coating 26 of a suitable additive such as disclosed in the above copending application is provided on the outer surface of the bare wire electrode 4, as most clearly shown in FIGURE 2 in the drawing.

The operation of the illustrated invention is summarized as follows. The transformer 1 is energized through the completion of the circuit to power lines 2. The voltage regulator 3 is preset by suitable graduated positioning of the control knob 22 to establish the desired output voltage.

The transformer 1 is of a constant potential construction and the output voltage has a relatively flat volt versus ampere characteristic. That is, the output voltage is maintained essentially at the preset value irrespective of the output current being drawn from the secondary winding 13 of the transformer 1.

As previously noted, the arc welding current passes through zero 120 times each second when using the conventional 60 cycle alternating current power. As the current passes through zero, the arc 6 is broken and must be reignited. The highly emissive characteristic of the coating 26 substantially lowers the necessary reignition voltage.

The reactor 11 acts to establish a slight phase shift of the supply voltage with respect to the arc current and the presence of a reignition voltage as the welding current passes through zero. The small voltage has been found to satisfactorily restrike the arc 6 in the presence of the emissive material on the electrode 4. In the absence of such additive material however, it is practically impossible to insure continuous re-establishment of the arc each time the current passes through zero.

The reactance inserted in the circuit by reactor 11, the emissivity of the coating 26 and the open circuit voltage of the supply are very closely related. As the open circuit voltage of the supply increases, the arc 6 is more readily reignited but the shock hazard increases substantially if the voltage is above 70 volts. Open circuit voltages in the range of 15 to 55 volts are considered most desirable to minimize the shock hazard.

The higher the emissivity of the coating 26, the lesser phase shift required between the welding current and the supply voltage. Generally, it has been found that the phase shift should preferably be about 26 degrees, depending upon the particular emissivity characteristic of the coating 24.

Generally, the welding process should include relatively high current densities in the arc 6. The high current densities establish and maintain a relatively hot arc which is in a highly ionized gaseous condition and in which an arc is more readily produced.

Applicant has satisfactorily welded with a constant potential power supply having a reactor 11 which produced a static volt-ampere droop of 3 volts per 100 amperes. A bare wire consumable electrode 4 of mild steel with a rubidium additive was employed. The electrode had a ⅟₁₆ inch diameter. The arc 6 was shielded with carbon dioxide. Approximately 300 amperes or more had to be supplied to the electrode, producing a current density of approximately 99,000 amperes per square inch, in order to satisfactorily employ the A.C. constant potential welding source and produce sound welds.

Reactor 11 may also be formed as an air core reactor. However, an air core reactor is somewhat larger and more cumbersome than the iron core reactor. Further, the reactor 9 may be made adjustable to vary the reactance for different welding current ranges.

The present invention may also be employed for submerged arc welding, cladding and the like wherein a flux cover is deposited over the weld area and encloses the arc. When so employed, the highly emissive material may be added directly to the flux cover if desired.

In gas-shielded welding processes, the emissive material might also be fed to the arc with the shielding gas. However, the composite electrode appears to have many advantages such as simplicity, uniformity of feed and the like.

The present invention provides a relatively inexpensive and highly stable alternating current constant potential welding system while eliminating the inherent instability normally associated with alternating current constant potential arc welding.

Various modes of carrying out the invention are contemplated as being within the scope of the following claims particularly pointing out and distinctly claiming the subject matter which is regarded as the invention.

I claim:

1. Arc welding apparatus for establishing a welding arc between an electrode and a work member, comprising a constant potential A.C. power supply including a limited inductive reactance in the output, and means to supply an emissive material to the arc, the emissivity of the said emissive material and the amplitude of said reactance being related to establish a stable arc at the tip of the electrode.

2. The arc welding apparatus of claim 1 wherein said constant potential A.C. power supply has a maximum open circuit voltage of about 55 volts.

3. Arc welding apparatus, comprising an A.C. constant potential power supply, an inductive reactance means connected to the output of the power supply, and a consumable steel electrode carrying a highly emissive material and connected in a series welding circuit with the reactance, the emissivity of said emissive material and the amplitude of said reactance being related to establish a stable arc at the tip of the electrode.

4. The arc welding apparatus of claim 3 wherein the reactance means includes a magnetic core and a reactance winding wound on the core and serially connected in the series welding circuit.

5. The arc welding apparatus of claim 3 wherein said electrode is a consumable electrode, and constant speed drive means is coupled to continuously feed the electrode at a constant feed.

6. The arc welding apparatus of claim 3 wherein said reactance establishes a phase shift of approximately 26 degrees between the output of the A.C. constant potential power supply and the current through the arc.

7. Arc welding apparatus, comprising a constant potential transformer for supplying an alternating current for welding, means to compensate for changes in the voltage applied to the transformer to maintain a selected output voltage, an inductive reactance means serially connected to the output of the transformer, a consumable metal electrode containing a highly emissive substance and connected in a series welding circuit with the reactance means, the amplitude of reactance of said reactance means being inversely related to the emissivity of the emissive substance and being selected to establish a stable arc with the least emissive substance, means to supply carbon dioxide shielding gas about the tip of the electrode, and means to feed the consumable electrode to the arc at a constant rate.

8. The process of arc welding which comprises, feeding an electrode including a small amount of a highly emissive substance toward a work member, and supplying a constant potential alternating current voltage in series with a limited amount of reactance across the electrode and the work member.

9. The process of gas-shielded consumable electrode arc welding which comprises, feeding a metal consumable electrode including a small amount of a highly emissive substance toward a work member at a constant speed, applying a constant potential alternating current voltage source across the electrode and the work member to establish and maintain an arc consuming the electrode at the rate of electrode feed, and including a limited amount of inductive reactance in the connection between the voltage source and the arc.

10. The process of claim 9 wherein the welding current density in the electrode is at least 99,000 amperes per square inch.

11. The process of claim 9 including the feeding of a shielding gas for enveloping the arc.

References Cited in the file of this patent

UNITED STATES PATENTS

| | | |
|---|---|---|
| 1,146,988 | Arendt | July 20, 1915 |
| 1,539,044 | Frickey | May 26, 1925 |
| 2,532,410 | Kennedy | Dec. 5, 1950 |
| 2,694,764 | Muller | Mar. 16, 1954 |
| 2,824,948 | Willigen | Feb. 25, 1958 |
| 2,880,375 | Cresswell | Mar. 31, 1959 |
| 3,054,884 | Manz | Sept. 18, 1962 |
| 3,078,362 | Steinert | Feb. 19, 1963 |

FOREIGN PATENTS

| | | |
|---|---|---|
| 223,512 | Australia | Dec. 5, 1957 |

OTHER REFERENCES

"Welding Handbook," 3rd edition, 1950, pages 182–185–6.